US012576816B2

(12) United States Patent
Filloux

(10) Patent No.: US 12,576,816 B2
(45) Date of Patent: Mar. 17, 2026

(54) PROCESS FOR DE-ICING A GLAZED SURFACE OF A VEHICLE

(71) Applicant: Valeo Systemes d'Essuyage, Le Mesnil Saint Denis (FR)

(72) Inventor: Alexandre Filloux, Le Mesnil Saint Denis (FR)

(73) Assignee: Valeo Systemes d'Essuyage, Le Mesnil Saint Denis (FR)

( * ) Notice: Subject to any disclaimer, the term of this patent is extended or adjusted under 35 U.S.C. 154(b) by 700 days.

(21) Appl. No.: 17/823,147

(22) Filed: Aug. 30, 2022

(65) Prior Publication Data

US 2023/0068777 A1 Mar. 2, 2023

(30) Foreign Application Priority Data

Aug. 31, 2021 (FR) ...................................... 2109097

(51) Int. Cl.
  *B60S 1/48* (2006.01)
  *B60S 1/02* (2006.01)
  *B60S 1/08* (2006.01)
(52) U.S. Cl.
  CPC ............... *B60S 1/485* (2013.01); *B60S 1/026* (2013.01); *B60S 1/0822* (2013.01); *B60S 1/486* (2013.01); *B60S 1/488* (2013.01)
(58) Field of Classification Search
  CPC ........ B60S 1/485; B60S 1/0822; B60S 1/026; B60S 1/486; B60S 1/488
  See application file for complete search history.

(56) References Cited

U.S. PATENT DOCUMENTS

| 2002/0137455 | A1* | 9/2002 | Ivanov | .................... B60S 1/482 |
| | | | | 454/157 |
| 2014/0027433 | A1* | 1/2014 | Lisinski | ............... H05B 1/0236 |
| | | | | 219/203 |

(Continued)

FOREIGN PATENT DOCUMENTS

| DE | 102009051263 A1 | 9/2010 |
| FR | 2957881 A1 | 9/2011 |

(Continued)

OTHER PUBLICATIONS

FR2973293 translation (Year: 2012).*
Preliminary Search Report and Written Opinion in corresponding French Application No. 2109097, dated May 10, 2022 (6 pages).

*Primary Examiner* — Michael E Barr
*Assistant Examiner* — Lauren G Orta
(74) *Attorney, Agent, or Firm* — Osha Bergman Watanabe & Burton LLP

(57) ABSTRACT

A process (1) for de-icing a glazed surface (20) of a vehicle (2) is disclosed. A de-icing device (21) includes a wiper system (210) with at least one device for spraying a liquid (L, Lq), and is used to perform a method involving verification (E1) of a primary condition (C1) according to which the ignition (Cc) of the said vehicle (2) is activated, verification (E2) of a secondary condition (C2) according to which the exterior temperature (t) is below a temperature threshold (Th1), verification (E3) of a tertiary condition (C3) according to which a demisting function (fd) is activated; and when all of the conditions are fulfilled, then activation (E4) of the de-icing device (21) in order to start a de-icing cycle (Cy). The de-icing cycle (Cy) comprising spraying by the device for spraying of the liquid (L, Lq) onto the glazed surface (20).

7 Claims, 4 Drawing Sheets

(56)     References Cited

U.S. PATENT DOCUMENTS

2017/0253201  A1      9/2017  Maeshiro
2020/0139939  A1 *    5/2020  Kubota  ..................... B08B 3/04

FOREIGN PATENT DOCUMENTS

FR          2973293  A1  *  10/2012   .............. B60S 1/026
FR          2993526  A1      1/2014

* cited by examiner

F1(ECU, C1(Cc, 22, 23))    E1

F2(ECU, C2(t, Th1))    E2

F3(ECU, C3(fd))    E3

F4(ECU, C, Cy)    E4

F1(ECU, C1(Cc, 22, 23))    E1

F2(ECU, C2(t, Th1))    E2

F3(ECU, C3(fd))    E3

F3'(ECU, C4(o, 27))    E3'

F4(ECU, C, Cy)    E4

[Fig. 4]
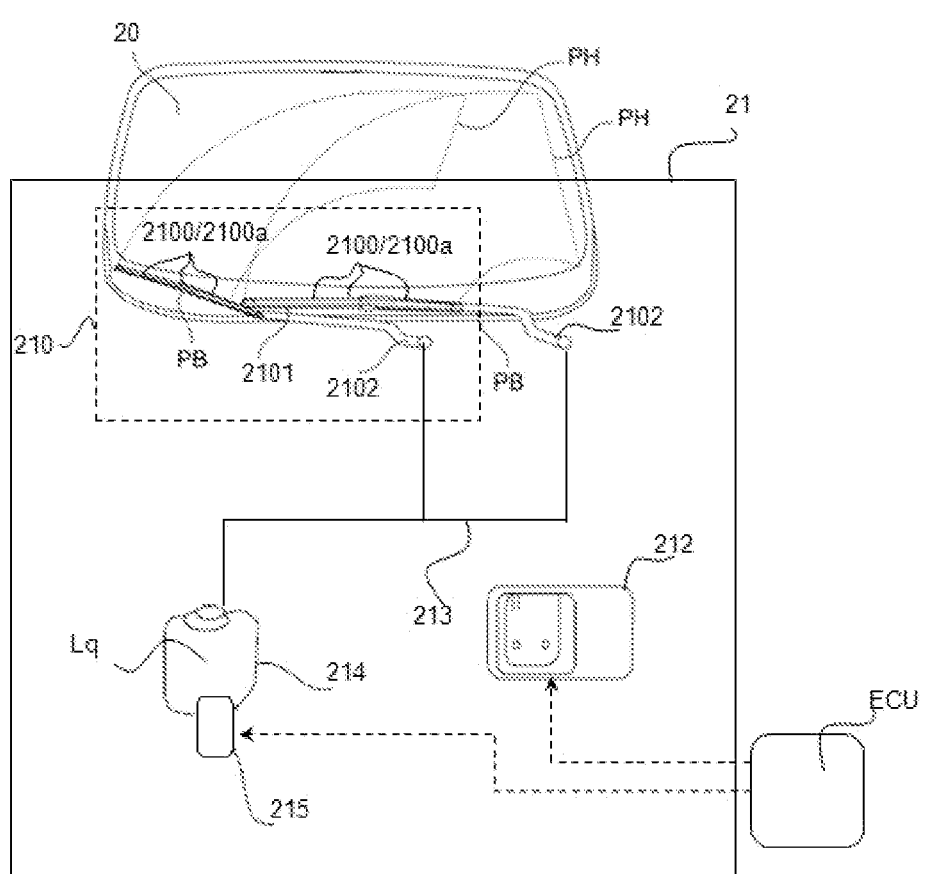

PROCESS FOR DE-ICING A GLAZED SURFACE OF A VEHICLE

The present invention relates to a process for de-icing a glazed surface of a vehicle. It has a particular, but non-limiting application in motor vehicles.

Persons skilled in the art are familiar with a process for de-icing a glazed surface of a vehicle, the said vehicle comprising a de-icing device comprising at least one reservoir containing a de-icing liquid, at least one wiper blade, and a device for spraying de-icing liquid onto the glazed surface. The de-icing process comprises activation of a motor for driving the said at least one wiper blade of the de-icing device, in order to start a de-icing cycle, and thus spray the de-icing liquid onto the glazed surface.

A disadvantage of this prior art is that the said de-icing process requires human intervention, since it is the user who triggers the de-icing process manually when required (remotely or not remotely). The objective of the present invention is to propose a process for de-icing a glazed surface of a vehicle which is automatic and autonomous, wherein human intervention is no longer necessary.

For this purpose, the invention proposes a process for de-icing a glazed surface of a vehicle, the said vehicle comprising a de-icing device comprising a wiper system with at least one device for spraying a liquid, characterised in that the said de-icing process comprises the steps of:

verification of a primary condition according to which the ignition of the said vehicle is activated;

verification of a secondary condition according to which the exterior temperature is below a temperature threshold;

verification of a tertiary condition according to which a demisting function is activated;

if all of the said conditions are fulfilled, then activation of the said de-icing device in order to start a de-icing cycle, the said de-icing cycle comprising spraying by the said at least one device for spraying of the said liquid onto the said glazed surface;

execution by the said de-icing device of the said de-icing cycle.

The process for de-icing of a glazed surface of a vehicle according to the invention thus makes it possible to start the de-icing of the glazed surface of the vehicle automatically when necessary, i.e. when ice is present on the said glazed surface, and when the vehicle is about to be used.

In non-limiting embodiments, the said process for de-icing a glazed surface of a vehicle can also comprise one or a plurality of additional characteristics taken alone or according to all the combinations technically possible from amongst the following.

In a non-limiting embodiment, the said temperature threshold is in the range from 3° to 5° C.

In a non-limiting embodiment, the said tertiary condition comprises activation of the demisting function and adjustment thereof to a maximum level.

In a non-limiting embodiment, the said de-icing cycle comprises spraying of a de-icing liquid.

In a non-limiting embodiment, the said de-icing cycle comprises spraying of a heated liquid.

In a non-limiting embodiment, the de-icing process comprises an additional step of verification of a quaternary condition according to which a person is present on a driver's seat of the said vehicle.

In a non-limiting embodiment, the said wiper system also comprises at least one wiper blade and at least one hydraulic ramp which forms the said at least one spraying device positioned at the level of the wiper blade.

In a non-limiting embodiment, the said vehicle comprises an ignition-starter switch, and the ignition of the said vehicle is activated if the said ignition-starter switch is in the position for ignition of the accessories.

In a non-limiting embodiment, the temperature threshold is equal to 4° C.

In a non-limiting embodiment, the heated liquid is water or a windscreen-washer liquid.

In a non-limiting embodiment, the temperature measurement device comprises one or a plurality of temperature sensors, or it is a meteorological server.

A system for de-icing a glazed surface of a vehicle is also proposed, the said de-icing system comprising a de-icing device comprising a wiper system with at least one device for spraying a liquid onto a glazed surface of a vehicle, characterised in that the said de-icing device is configured to execute a de-icing cycle, the said de-icing cycle comprising spraying by the said at least one device for spraying of the said liquid onto the said glazed surface, and in that the said de-icing system also comprises:

a temperature measurement device which is configured to measure the exterior temperature; and—an electronic control unit which is configured to:

receive primary information relating to an ignition of the said vehicle;

according to this primary information, verify a primary condition according to which the ignition of the vehicle is activated;

receive secondary information relating to an exterior temperature;

according to this secondary information, verify a secondary condition according to which the exterior temperature is below a temperature threshold;

receive tertiary information relating to a demisting function; according to this tertiary information, verify a tertiary condition according to which the demisting function is activated;

if all of the said conditions are fulfilled, then activate the said de-icing device in order to start a de-icing cycle.

In a non-limiting embodiment, the said electronic control unit is also configured to:

receive quaternary information relating to the presence of a person on a driver's seat of the vehicle;

according to this quaternary information, verify a quaternary condition according to which a person is present on the said driver's seat.

A computer programme product is also proposed, comprising instructions which, when the programme is executed by a computer, lead the programme to implement the steps of the de-icing process according to any one of the preceding characteristics.

A non-transitory storage support which can be read by a computer is also proposed, comprising instructions which, when they are executed by a computer, lead the computer to execute the de-icing process according to any one of the preceding characteristics.

The invention and its different applications will be better understood by reading the following description and examining the accompanying figures:

FIG. 1 is a flowchart of a process for defrosting of a glazed surface of a vehicle, In a non-limiting embodiment of the invention;

FIG. 2 is a flowchart of the defrosting process in FIG. 1, the said defrosting process comprising an additional step, In a non-limiting embodiment;

FIG. 3 is a schematic figure of a de-icing system which is configured to implement the said de-icing process in FIGS. 1 and 2, In a non-limiting embodiment;

FIG. 4 is a schematic figure of a de-icing device of the de-icing system in FIG. 3 for a glazed surface of a vehicle, the said de-icing device being activated by the said de-icing process in FIGS. 1 and 2, In a non-limiting embodiment.

Elements which are identical in terms of structure or function appearing in different figures retain the same references, unless otherwise specified.

The process 1 for de-icing a glazed surface 20 of a vehicle 2 according to the invention is described with reference to FIGS. 1 to 4 In non-limiting embodiments. In one non-limiting embodiment, the vehicle 2 is a motor vehicle. The term motor vehicle is understood to mean any type of motorised vehicle. This embodiment is taken as a non-limiting example throughout the remainder of the description. Throughout the remainder of the description, the vehicle 2 is thus otherwise called a motor vehicle 2. In one non-limiting embodiment, the glazed surface 20 is the glazed surface of the windscreen of the vehicle 2.

Figure 3:
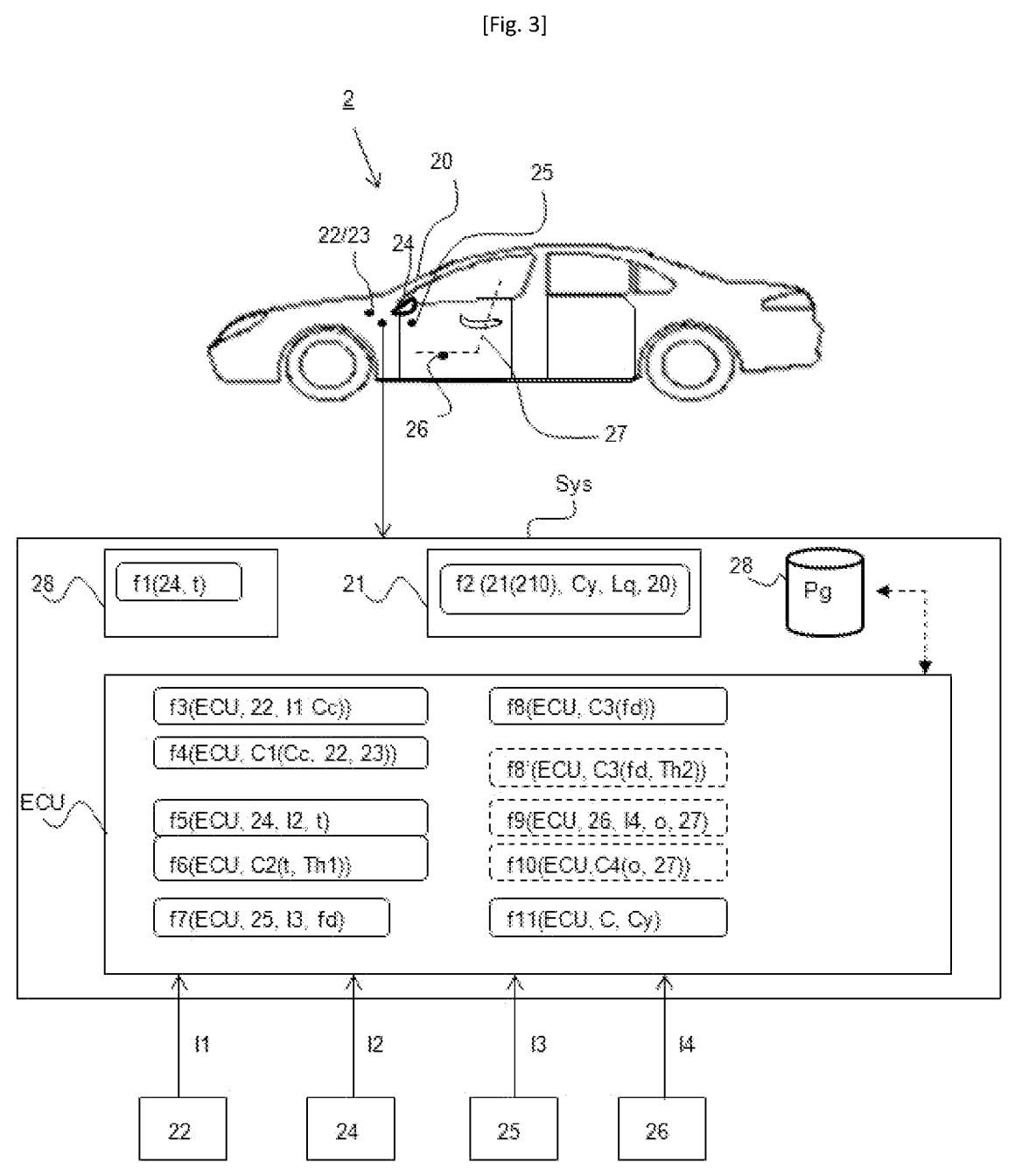

The motor vehicle 2 is illustrated in FIG. 3.

As illustrated in FIG. 3, the motor vehicle 2 also comprises a de-icing device 21 which is configured to de-ice the glazed surface 20 of the motor vehicle 2. As illustrated in FIG. 3, the motor vehicle 2 also comprises an ignition-starter switch 22 and accessories 23. As illustrated in FIG. 3, the motor vehicle 2 also comprises a temperature measurement device 24, which is configured to measure the exterior temperature t. In a non-limiting example illustrated in FIG. 3, the device is at the level of a driving mirror of the motor vehicle 2. As illustrated in FIG. 3, the motor vehicle 2 also comprises a man-machine interface 25 which is associated with a demisting function fd. In a non-limiting example, the man-machine interface 25 is a rotary knob which makes it possible to activate/deactivate the demisting function, but also to select the levels of demisting, i.e. to regulate the demisting power. As illustrated in FIG. 3, In a non-limiting embodiment, the motor vehicle 2 also comprises at least one presence sensor 26 which is situated at the level of the driver's seat 27 of the motor vehicle 2. This makes it possible to detect whether a person o is seated on the driver's seat 27 or not, and thus whether the driver's seat 27 is occupied or not.

As illustrated in FIG. 4, the de-icing device 21 comprises:
  a wiper system 210;
  a drive motor 212;
  a channeling system 213;
  a reservoir 214 for storage of a liquid L, Lq;
  at least one pump 215.

As illustrated in FIG. 4, the said wiper system 210 comprises:
  at least one spraying device 2100 having at least one orifice 2100a through which the liquid L, Lq can be sprayed onto the glazed surface 20;
  at least one wiper arm 2101 (also known as a blade); and
  a drive arm 2102, also known as an arm) which is connected to the said at least one wiper blade 2101 via a connection device (not illustrated).

The wiper system 210 which is used for the de-icing is the same as the one used to clear water and dirt from the glazed surface 20.

In a non-limiting embodiment illustrated, the wiper system 210 comprises at least one drive arm 2102, which is connected to the wiper blade 2101, and carries out an angular to-and-fro movement in relation to the glazed surface 20, between a low position PB and high position PH.

In particular, the drive arm 2102 is arranged in a rod which extends along a longitudinal axis, and one end of which is connected to the wiper blade 2101 by means of a connection device (not illustrated), and another end of which is connected to a means for driving the wiper blade 2101, such as a drive motor 212.

In non-limiting embodiments, the said at least once spraying device 2100 is on the wiper blade 2101, or at the level of the drive arm 2102, or at the level of the arm/blade connection device, or also on the bonnet of the motor vehicle 2. It is possible to have a combination of these different embodiments. In a non-limiting embodiment, the spray device 2100 comprises a plurality of orifices 2100a. Thus, In non-limiting embodiments, the orifices 2000a are on the wiper blade 2101, or at the level of the drive arm 2102, or at the level of the arm/blade connection device, or also on the bonnet of the motor vehicle 2. The orifices 2100a can be positioned such as to spray liquid L, Lq towards the top of the wiper blades 2101, i.e. towards the top of the glazed surface 20, or they can be positioned such as to spray liquid L, Lq towards the bottom of the wiper blades 2101, i.e. towards the bottom of the glazed surface 20.

In a non-limiting embodiment, each wiper blade 2101 comprises at least one hydraulic ramp (otherwise known as a ramp) with orifices 2100a through which the liquid L, Lq can be sprayed/spread onto the glazed surface 20. The hydraulic ramp thus forms the spraying device 2100. In a non-limiting variant embodiment, each wiper blade 2101 comprises two ramps, one of the ramps having orifices 2100a which are configured to spray the liquid L, Lq towards the top of the glazed surface 20, and the other ramp having orifices 2100a which are configured to spray the liquid L, Lq towards the bottom of the glazed surface 20. These ramps can spray the liquid simultaneously or alternately according to the direction of displacement of the wiper blade 2101. The or each ramp of a wiper blade 2101 is supplied with liquid L, Lq by means of the channeling system 213.

The drive motor 212 is configured to drive the wiper blade(s) 2101 by means of the drive arms 2102, between their respective bottom positions PB and top positions PH.

The channeling system 213 connects the reservoir 214 to the orifices 2100a of the said at least one spraying device 2100.

In a non-limiting embodiment, the reservoir 214 is a reservoir which is independent from the reservoir comprising windscreen-washer liquid, each reservoir being associated with a different pump. In another non-limiting embodiment, the reservoir 214 can be partitioned, and comprises two compartments for storage respectively of liquid L, Lq and windscreen-washer liquid, each compartment being associated with a different pump.

The said at least one pump 215 is associated with the reservoir 214 comprising the liquid L, Lq, and is configured to circulate the liquid L, Lq in the channeling system 213 until it is ejected via the orifice(s) 2100a of the said at least one device 2100 for spraying onto the glazed surface 20, i.e. the glazed surface 20 of the windscreen in the non-limiting example taken.

In order to apply the liquid L, Lq onto the glazed surface of the vehicle 2, the de-icing process 1 is described hereinafter with reference to FIGS. 1 and 2, in a non-limiting embodiment. The de-icing process 1 is implemented by a de-icing system Sys which comprises an electronic control unit (ECU).

The electronic control unit ECU is configured to verify the following conditions C:

whether the ignition Cc of the vehicle 2 is activated;

whether the exterior temperature t is below a temperature threshold Th1;

whether a demisting function fd is activated.

Thus, in a step E1 illustrated F1(ECU, C1(Cc, 22, 23)), the electronic control unit ECU verifies a primary condition C1 according to which the ignition Cc of the said motor vehicle 2 is activated.

The electronic control unit ECU verifies the exterior temperature t via ignition information I1 which it receives from the ignition-starter switch 22. It will be noted that the ignition Cc of the said vehicle 2 is activated if the ignition-starter switch 22 is in the position for ignition of the accessories 23. It will be noted that, if the ignition Cc of the vehicle is activated, this means that the vehicle 2 is being used, and will soon be travelling. The same applies if the driver's seat 27 is occupied.

Thus, in a step E2 illustrated F2(ECU, C2($t$, Th1)), the electronic control unit ECU verifies a secondary condition C2 according to which the exterior temperature t is below a temperature threshold Th1.

The electronic control unit ECU verifies the exterior temperature t via temperature information I2 which it receives from the temperature measurement device 24. In a non-limiting embodiment, the temperature threshold Th1 is between 3° and 5° C. In a non-limiting variant embodiment, the temperature threshold Th1 is equal to 4°. This exterior temperature value t corresponds in general to the temperature below which the ice forms.

Thus, in a step E3 illustrated F3(ECU, C3($fd$)), the electronic control unit ECU verifies a tertiary condition C3 according to which a demisting function fd is activated.

The electronic control unit ECU verifies whether the demisting function fd is activated via demisting information I3 it receives from the man-machine interface 25, which permits activation/deactivation of this demisting function fd. This demisting function fd is an aid for de-icing of the glazed surface 20. When the demisting function fd is activated, this activates a blower which sends air onto the glazed surface 20 from the interior of the motor vehicle 2.

In a non-limiting embodiment, the tertiary condition C3 comprises activation of the demisting function fd and adjustment thereof to a maximum level Th2, otherwise known as the maximum demisting level Th2. Thus, In a non-limiting embodiment, the electronic control unit ECU verifies the tertiary condition C3 according to which the demisting function fd is activated and adjusted to the maximum level Th2.

In a non-limiting embodiment, the maximum demisting level Th2 is the final level corresponding to the maximum demisting power.

In a non-limiting embodiment, the electronic control unit ECU is also configured to verify whether the driver's seat 27 is occupied.

Figure 2:
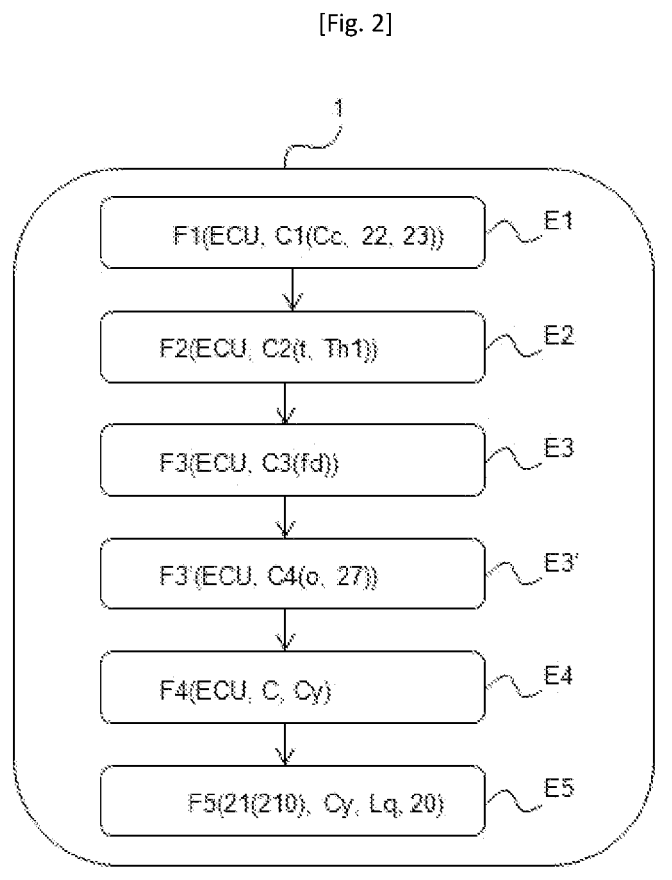

Thus, In a non-limiting embodiment illustrated in FIG. 2, in a step E3' illustrated F3'(ECU, C4($o$, 27)), the electronic control unit ECU verifies a quaternary condition C4 according to which a person o is present on the driver's seat 27 of the said motor vehicle 2.

It will be noted that the steps E1 to E3, and if applicable E3', can be carried out simultaneously or sequentially in any order, or some of them can be carried out simultaneously and others sequentially in any order.

Figure 1:
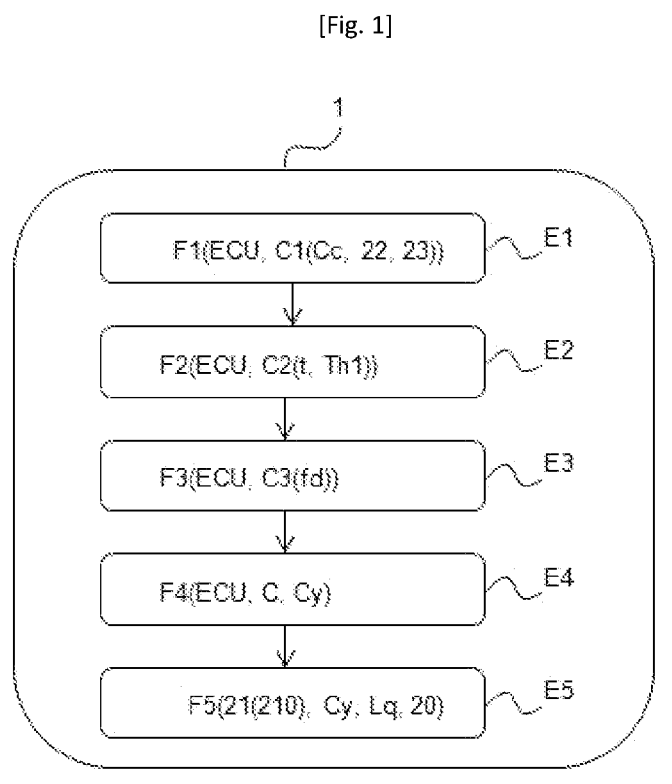

In a step E4 illustrated in FIG. 1 and FIG. 2 F4(ECU, C, Cy), if all of the conditions C are fulfilled, then the electronic control unit ECU activates the de-icing device 21 in order to start a de-icing cycle Cy. "Activation of the de-icing device 21" means that the electronic control unit ECU sends a command to the de-icing device 21 to control the pump 215 and to control the drive motor 212.

Thus, in order to start the de-icing cycle Cy, it is necessary for:

the ignition Cc of the said vehicle 2 to be activated; and the exterior temperature t to be below a temperature threshold Th1; and the demisting function fd to be activated.

In the case when the conditions C4 is also verified, it is necessary for:

the ignition Cc of the said vehicle 2 to be activated; and the exterior temperature t to be below a temperature threshold Th1; and the demisting function fd to be activated; and for there to be a person o seated on the driver's seat 27.

It will be noted that, if there is no-one on the driver's seat 27, this means that the person is in the process of de-icing manually. The electronic control unit ECU does not start the de-icing cycle Cy.

Activation of the de-icing device 21 comprises:

activation of the drive motor 212, which makes it possible to drive the wiper blade 2101 of the wiper system 210;

activation of the pump 215, which makes it possible to circulate the liquid L, Lq in the channeling system 213 until it is ejected via the orifice(s) 2100$a$ of the spraying device(s) 2100 onto the glazed surface 20.

In a step D5 illustrated in FIG. 1 and FIG. 2 F5(21(210), Cy, L, Lq, 20), the de-icing cycle Cy is thus executed. It is executed by the de-icing device 21. The de-icing cycle Cy comprises spraying by the said at least one spraying device 2100 of the said liquid L, Lq onto the said glazed surface 20.

In a first non-limiting embodiment, the said de-icing cycle Cy comprises spraying of a de-icing liquid L. In a second non-limiting embodiment, the said de-icing cycle Cy comprises spraying of a heated liquid Lq. In non-limiting examples, the liquid Lq which is heated is water or windscreen-washer liquid. For this purpose, heating elements (not illustrated) are used to heat the said liquid Lq. This second non-limiting embodiment makes it possible not to use specific liquid Lq for the de-icing, such as a de-icing liquid L. Thus, the reservoir used for the standard wiping function which is designed to remove water and dirt from the glazed surface 20 can be used as the reservoir 214 used for the de-icing. This avoids having to have an additional tank. This therefore reduces the space required in the motor vehicle 2. In a non-limiting embodiment, one or a plurality of heating resistors are plunged into the tank 214 for storage of liquid Lq in order to heat the said liquid Lq. In another non-limiting embodiment, one or a plurality of heating elements are embedded in the walls of the ducts situated between the tank 214 for storage of liquid Lq and the orifices 2100$a$ for spraying of the liquid Lq.

Thus, thanks to the testing of the conditions C1 to C3, and if applicable C4, de-icing of the glazed surface 20 of the motor vehicle 2 can be started, i.e. executed, automatically and autonomously, without anyone needing to intervene. The glazed surface 20 of the motor vehicle 2 is therefore de-iced before the motor vehicle 2 starts to travel. This allows the motor vehicle 2 to be made operational rapidly.

Thus, the de-icing process 1 is implemented by a system Sys for de-icing a glazed surface 20 of a vehicle 2. The de-icing system Sys is illustrated in FIG. 3.

The de-icing system Sys comprises:

a temperature measurement device 24 which is configured to measure the exterior temperature t (function illustrated f1(24, t)):

the said de-icing device 21 comprises a wiper system 210 with at least one spraying device 2100, the said de-icing device 21 being configured to execute a de-icing cycle Cy, the said de-icing cycle Cy comprising spraying by the said at least one device 2100 for spraying of the said liquid L, Lq onto the said glazed surface 20 (function illustrated f2(21(210), Cy, L, Lq, 20)); and—the said electronic control unit ECU.

The functions of the electronic control unit ECU are illustrated in FIG. 3.

The electronic control unit ECU is configured to cooperate with the ignition-starter switch. The electronic control unit ECU is thus configured to:

receive primary information I1 relating to an ignition Cc of the said vehicle 2 (function f3(ECU, 22, I1, Cc). The primary information I1 is otherwise known as ignition information I1;

according to this primary information I1, verify whether the ignition Cc of the vehicle 2 is activated (function f4(ECU, C1(Cc, 22, 23))). Thus, the electronic control unit ECU verifies the primary condition C1.

Thus, the electronic control unit ECU receives this primary information I1 from the ignition-starter switch 22.

In addition, the electronic control unit ECU is configured to cooperate with the said temperature measurement device 24 in order to retrieve the exterior temperature t. In non-limiting embodiments, the temperature measurement device 24 comprises one or a plurality of temperature sensors, or is a meteorological server. In non-limiting examples, the said at least one temperature sensor is placed in a driving mirror, in the engine compartment of the motor vehicle, etc. The electronic control unit is thus configured to:

receive secondary information I2 relating to the exterior temperature t (function f5(ECU, 24, I2, t)). This secondary information I2 is otherwise known as temperature information I2;

according to this primary information I2, verify whether the exterior temperature t is below a temperature threshold Th1 (function f6(ECU, C2(t, Th1))). Thus, the electronic control unit ECU verifies the secondary condition C2.

Thus, the electronic control unit ECU receives the value of the said exterior temperature t, from the temperature sensor or plurality of sensors or from a meteorological server.

In addition, the electronic control unit ECU is configured to cooperate with the man-machine interface 25 used for the demisting function fd. The electronic control unit ECU is thus configured to:

receive tertiary information I3 relating to a demisting function fd (function f7(ECU, 25, I3, fd)). This tertiary information I3 is otherwise known as demisting information I3;

according to this tertiary information I3, verify whether the demisting function fd is activated (function f8(ECU, C3(fd))). Thus, the electronic control unit ECU verifies the tertiary condition C3. In a non-limiting embodiment, the electronic control unit ECU is configured, according to this tertiary information I3, to verify whether the demisting function fd is activated and adjusted to the maximum level Th2 (function f8'(ECU, C3(fd, Th2))).

Thus, the electronic control unit ECU receives the information from the man-machine interface 25 indicating that the demisting function fd is activated, and at which level.

Finally, In a non-limiting embodiment, the electronic control unit ECU is configured to cooperate with at least one sensor 26 for the presence of the motor vehicle 2. Thus, In a non-limiting embodiment, the electronic control unit ECU is configured to:

receive quaternary information I4 relating to the presence of a person or concerning a driver's seat 27 of the vehicle (function f9(ECU, 26, 14, o, 27)). This quaternary information 14 is otherwise known as presence information;

according to this quaternary information 14, verify whether a person o is present on the driver's seat 27 (function f10(ECU, C4(o, 27))). Thus, the electronic control unit ECU analyses the quaternary information I4 and deduces from it whether there is a person on the driver's seat 27 or not. Thus, the electronic control unit ECU verifies the quaternary condition C4.

Thus, the electronic control unit ECU receives from the presence sensor(s) 26 the information indicating whether the driver's seat 27 is occupied or not.

Since the functions f8', f9 and f10 are optional, they are illustrated in broken lines in FIG. 3. Thus, the electronic control unit ECU receives from the presence sensor or plurality of sensors the information concerning occupation of the driver's seat 27.

Finally, if all of the conditions C are fulfilled, i.e. If the exterior temperature t is below the temperature threshold Th1, if the ignition Cc of the vehicle 2 is activated, and if the demisting function fd is activated, and if applicable if there is a person o on the driver's seat 27, the electronic control unit ECU is configured to activate the said de-icing device 21 in order to start a de-icing cycle Cy (function f11(ECU, C, Cy)).

Thus, when it is activated, the de-icing device 21 executes the de-icing cycle Cy (function f2 previously described).

It will be noted that the primary information I1, the secondary information I2, the tertiary information I3, and the quaternary information I4 are transmitted via the vehicle network. In non-limiting examples, the vehicle network is a CAN or LIN network.

It will be noted that the de-icing system Sys can comprise one or a plurality of computer programme products Pg comprising one or a plurality of instruction sequences which can be executed by the said electronic control unit ECU, the execution of the said sequences of instructions making it possible to implement the de-icing process 1 described.

A computer programme Pg of this type can be entered in a non-volatile read-only memory of the ROM type, or in a non-volatile rewritable memory of the EEPROM or FLASH type. The said computer programme Pg can be entered in the memory in the factory, or loaded into the memory, or loaded into the memory remotely. The sequences of instructions can be machine instruction sequences, or also sequences of a control language interpreted by the electronic control unit ECU at the moment of their execution. In the non-limiting example in FIG. 3, a computer programme Pg is entered into a memory 28 of the de-icing system Sys.

Thus, the de-icing system Sys has at least one memory 28 which is coupled to the said electronic control unit ECU. The memory 28 is a non-transitory storage support which can be read by a computer, comprising instructions which, when they are executed by a computer, lead the computer to execute the said de-icing program 1.

It will be appreciated that the description of the invention is not limited to the embodiments described above and to the field described above. Thus, In another non-limiting embodiment, the de-icing process 1 can also be applied to lateral glazed surfaces 20 of lateral windows of the vehicle 2. Thus, In another non-limiting embodiment, the de-icing process 1 can be applied to a glazed surface 20 of the rear window of the vehicle 2.

Thus, the invention described has the following advantages in particular:

it makes it possible to verify the conditions in which the de-icing device 21 can be activated, in particular when the vehicle 2 is about to be used (if the ignition Cc of the vehicle 2 is activated, and, if applicable, if the driver's seat 27 is occupied), when there is ice, and when the demisting function fd is being used;

it makes it possible to use for de-icing of the glazed surface 20 the same wiper system 210 which is used to remove water and dirt from the glazed surface 20;

it enables the user to save time, since the de-icing is started automatically without intervention by the user before he uses the vehicle 2, with the de-icing taking a few minutes;

it is simple to implement.

The invention claimed is:

1. A method for de-icing a glazed surface of a vehicle, the vehicle comprising a de-icing device comprising a wiper system with at least one device for spraying a liquid, the method comprising:

verification of a primary condition according to which an ignition of the vehicle is activated;

verification of a secondary condition according to which an exterior temperature is below a temperature threshold;

verification of a tertiary condition according to which a demisting function is activated;

verification of a quaternary condition according to which a person is present on a driver's seat of the vehicle;

when all of the conditions are fulfilled, then activation of the de-icing device to start a de-icing cycle, the de-icing cycle comprising spraying by the at least one device for spraying of the liquid onto the glazed surface; and execution by the de-icing device of the de-icing cycle.

2. The de-icing method according to claim 1, wherein the temperature threshold is in the range from 3° C. to 5° C.

3. The de-icing method according to claim 1, wherein the tertiary condition comprises activation of the demisting function and adjustment thereof to a maximum level.

4. The de-icing method according to claim 1, wherein the de-icing cycle comprises spraying of a de-icing liquid.

5. The de-icing method according to claim 1, wherein the de-icing cycle comprises spraying of a heated liquid.

6. The de-icing method according to claim 1, wherein the wiper system also comprises at least one wiper blade and at least one hydraulic ramp which forms the at least one spraying device positioned at the level of the wiper blade.

7. The de-icing method according to claim 1, wherein the vehicle comprises an ignition-starter switch, and the ignition of the vehicle is activated when the ignition-starter switch is in a position for ignition of accessories.

* * * * *